Feb. 14, 1939.　　A. BEETLESTONE ET AL　　2,147,481
ELECTRICAL RESISTOR
Filed Sept. 3, 1936
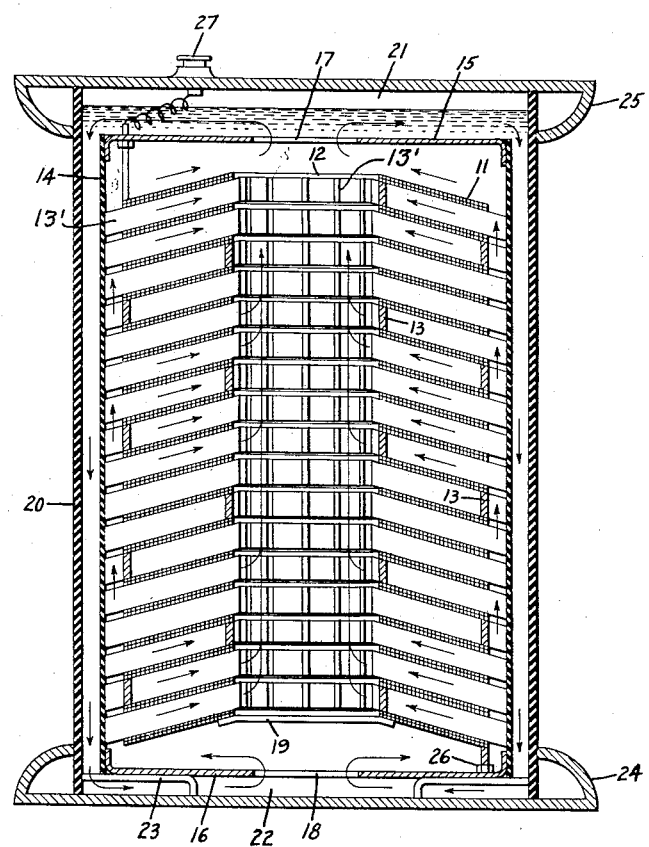
Inventors:
Andrew Beetlestone,
Frank Waterton,
by Harry E. Dunham
Their Attorney.

Patented Feb. 14, 1939

2,147,481

UNITED STATES PATENT OFFICE 2,147,481

ELECTRICAL RESISTOR

Andrew Beetlestone, Timperly, and Frank Waterton, Ashton-on-Mersey, England, assignors to General Electric Company, a corporation of New York Application September 3, 1936, Serial No. 99,282
In Great Britain October 12, 1935

4 Claims. (Cl. 201—65)

This invention relates to electrical resistors.

In connection with high voltage equipments, for example X-ray sets, testing sets and laboratory equipments, the voltage is often measured by observing the current flowing through a known resistance. Owing to the small output available from many of the direct current generators used for high voltage purposes it is necessary to limit the current consumption of the volt meter circuit to 1 milliampere; consequently in order to measure a voltage of the order of 100,000 volts, a resistance of 100 megohms is required. From general considerations the mechanical dimensions of such a resistance should be as small as possible in view of the compact nature of some of the equipments with which it is desired to use it.

The principal object of the invention is to construct a high resistance, for example of the order of 100 megohms in a very small and compact form and which is therefore specially suitable for use in measuring high voltages as above indicated, though its use is not limited to this particular purpose. Since a considerable amount of heat is developed in the resistance special consideration is given in the improved construction of the dissipation of this heat by arranging the circulation of the convection currents in the medium surrounding the resistance to give the maximum cooling effect. Other and further objects and advantages will become apparent as the description proceeds.

According to the invention in the preferred form the improved resistance is formed of a stack of pancake coils having a preferably slight conicity. Each coil comprises one or a comparatively few layers in the axial direction with a central orifice. The coils are spaced apart in the stack and may be coaxially supported in a closed container, which, however, is of greater external horizontal cross-section than the cross-section of the stack of coils. In the preferred construction the container is filled with an insulating fluid, for example, an insulating liquid such as oil and a baffle is located between the outer edges of the coils and the container, the arrangement being such that a circulation of the liquid due to convection takes place from the outer edges of the coils radially inwards over the surfaces thereof and then upwards through the central orifices of the coils which form a central flue. The liquid at the top of the container passes downwards between the baffle and the wall of the container, and then from the bottom of the container upwardly within the baffle to the edges of the coils again.

The invention may be understood more readily from the following detailed description when considered in connection with the accompanying drawing and those features of the invention which are believed to be novel and patentable will be pointed out in the claims appended hereto. The single figure of the drawing is an elevation, partially in section, showing by way of example a constructional embodiment of the invention.

There are provided a plurality of resistance units or coils 11 which may be wound with a high resistance spiral cord similar to that used in the manufacture of what are called spaghetti resistances and have central orifices or openings 12. The conicity of the coils 11 is comparatively small, the angle of the order of 140°. The coils 11 are made in a special jig the cord being wound with two layers of cellulose acetate ribbon between each turn. The ribbon is of the order of 0.0015 to 0.002 inch in thickness. Before the wound coil is withdrawn from the jig it may be treated with insulating varnish on one side and after withdrawal from the jig the coil is dipped or treated on both sides and allowed to dry. On assembly the coils are connected in series by means of brass terminal blocks 13 and are separated by radial spacers 13' made of cellulose acetate sheet, which may be approximately ⅛ inch thick, placed on edge. The stack of coils is fitted into an inner cylinder or baffle 14 with a space between their circumferential edges and the wall of the baffle which is closed at the top and bottom by plates 15 and 16 having central orifices 17 and 18 about the same size as the central orifices 12 in the pancake coils 11. Space is left between the top and bottom plates of the baffle and the top and bottom coils respectively. The central orifice of the lowermost coil in the stack is covered by a plate 19. The inner cylinder or baffle 14 with the coils in position is then secured in a container or tank 20 an annular space being provided between the outer wall of the baffle 14 and the inner wall of the container 20 and a space being also left at the top and bottom walls 21 and 22 of the container 20 above and below the top and bottom plates 15 and 16 of the baffle 14 respectively. To maintain the desired opening at the bottom, feet 23 are preferably provided. Rounded metal stress distributing plates 24 and 25 may be provided outside the container at the top and bottom, being electrically connected to the grounded end 26 and the high tension terminal 27 respectively.

The cylindrical wall of the container 20 and the cylindrical baffle 14 are made of insulating material, preferably of one of the synthetic resinous products, the top and bottom plates 15 and 16 of the baffle being made of thin sheet metal such as aluminium.

The resistance in the construction described may have a resistance wire of 0.0008 inch diameter wound in a spiral on a core 0.1 inch in diameter, preferably of cellulose acetate or other convenient fibre. The container or tank in such a case will be about 15½ inches high and the overall diameter about 9 inches for a resistance of the order of 100 megohms.

It is found that with this construction a very effective circulation of the liquid in the container takes place when current is passed through the resistance, the heat developed being transferred from the wire coils to the circulating liquid and communicated to the inside surface of the tank whence it is radiated to the atmosphere. The convection paths of the liquid are shown by the arrows.

In accordance with the provisions of the patent statutes, we have described the principle of operation of our invention, together with the apparatus which we now believe to represent the best embodiment thereof, but we desire to have it understood that the apparatus shown and described is only illustrative and that our invention may be carried out by other arrangements.

What we claim as new and desire to secure by Letters Patent of the United States, is:

1. A resistor comprising, a plurality of vertically spaced pancake type resistance coils of slight conicity with central orifices but otherwise without openings therein, a container for said coils with end and side walls and with one end up and the other end down, insulating fluid within said container, baffles surrounding said coils within said container and spaced from the walls of said container and means closing the orifice in the lowermost coil, the baffles at the ends of said container having central orifices, the said coils having their highest portions at the center.

2. A resistor comprising, a plurality of vertically spaced pancake type resistance coils of slight conicity with central orifices, a cylindrical container for said coils, insulating fluid within said container, a cylindrical baffle surrounding said coils, and a pair of metal baffle plates with central orifices at the ends of said cylindrical baffle spaced from the ends of said container said container and cylindrical baffle having vertical axes, the outer edges of said baffle plates joining said cylindrical baffle, said coils having their highest portions at the center.

3. A resistor comprising, a plurality of spaced pancake type resistance coils of slight conicity with central orifices, stacked one above the other, a cylindrical container for said coils with walls spaced from said resistance coils, insulating fluid within said container, and a baffle closing the central orifice of the lowermost of said resistance coils said container having a vertical axis, said coils having their highest portions at the center.

4. A resistor comprising, resistance material formed into a structure with openings therein for convection of cooling and insulating fluid, a container for said resistance structure, cooling and insulating fluid within said container, and a baffle surrounding said resistance structure and spaced from the walls of said container said container and baffle having vertical axes and side walls, said openings in the resistance structure including sloping passageways gradually rising from the sides of the resistance structure toward the center, and a vertical central passageway communicating with said sloping passageways and open at the top only.

FRANK WATERTON.
ANDREW BEETLESTONE.